United States Patent [19]

Porter

[11] Patent Number: 5,014,580
[45] Date of Patent: May 14, 1991

[54] CENTERING STAND FOR CYLINDER HOLDER

[75] Inventor: Ronald J. Porter, Reno, Nev.
[73] Assignee: Sierra Machinery, Inc., Sparks, Nev.
[21] Appl. No.: 392,234
[22] Filed: Aug. 10, 1989
[51] Int. Cl.$^5$ .............................................. B23B 25/00
[52] U.S. Cl. ...................................... 82/164; 82/162
[58] Field of Search ................ 82/164, 162, 163, 157, 82/149; 269/71, 73

[56] References Cited

U.S. PATENT DOCUMENTS

| | | | |
|---|---|---|---|
| 1,534,963 | 4/1925 | Judd | 82/164 |
| 3,320,839 | 5/1967 | Dinsmore | 82/164 |
| 3,600,990 | 8/1971 | Renoux | 82/162 |
| 4,463,635 | 8/1984 | Hafla et al. | 82/162 |

Primary Examiner—Frederick R. Schmidt
Assistant Examiner—Lawrence Cruz
Attorney, Agent, or Firm—Townsend and Townsend

[57] ABSTRACT

A centering stand (2) for positioning a work piece for rotary skiving and roller burnishing operations resulting in a hollow cylinder (4). The centering stand includes a vice (8) having a pair of grips (26, 26') for retaining the cylinder in proper position for rotary operations. A base plate (10) is movable together with the vice between a raised position supporting the cylinder and a lower position removed therefrom. The centering stand includes a plurality of guide members (14) having a track (20) formed on in inner surface (15) of each of the guide members for movement of the base plate in the track. The track includes a recess (21) formed on the inner surface of each guide member and a track plate (19) mounted to an outer surface of the guide members. Thus, the base vertically slides within the recesses and is retained in the track by the track plate. Positive positioning means (12) automatically locates the base plate to ensure alignment and centering of the cylinder in proper position for rotary operation, thereby minimizing bowing of the cylinder. The positive positioning means includes a dovetail (24) formed on an upper surface (9) of the base plate and a lip (22) cooperating with the dovetail disposed at an upper end (13) of the guide members. A lift (16) is provided for moving the base plate within the track.

15 Claims, 2 Drawing Sheets

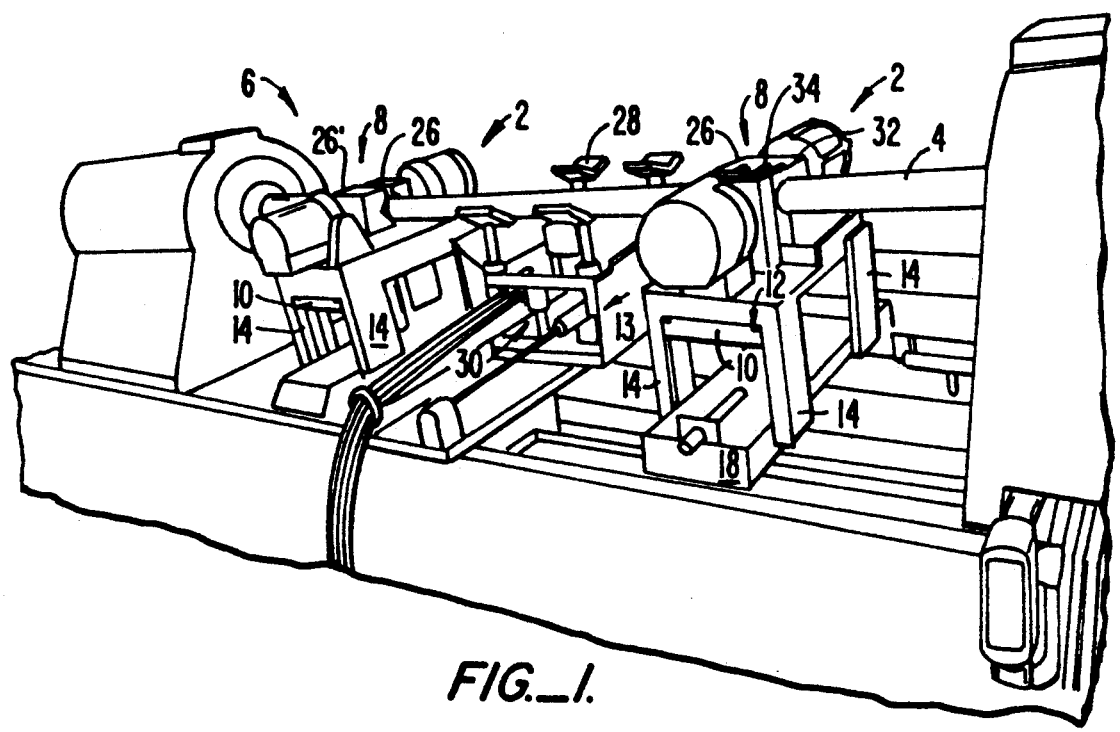
FIG._1.
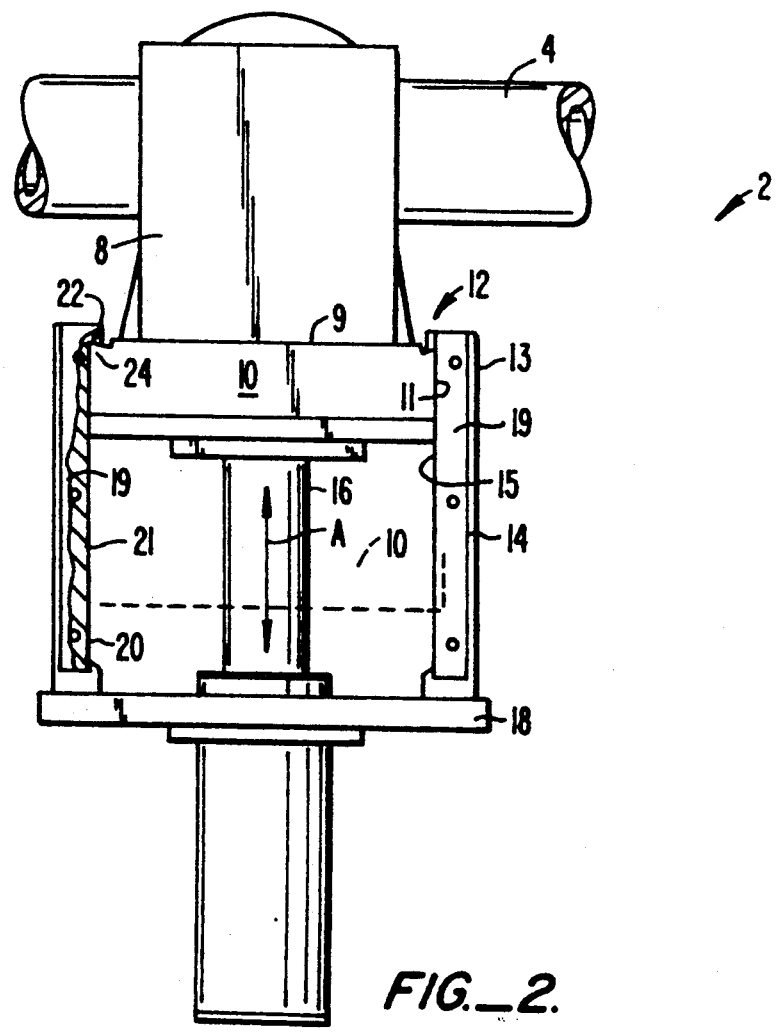
FIG._2.

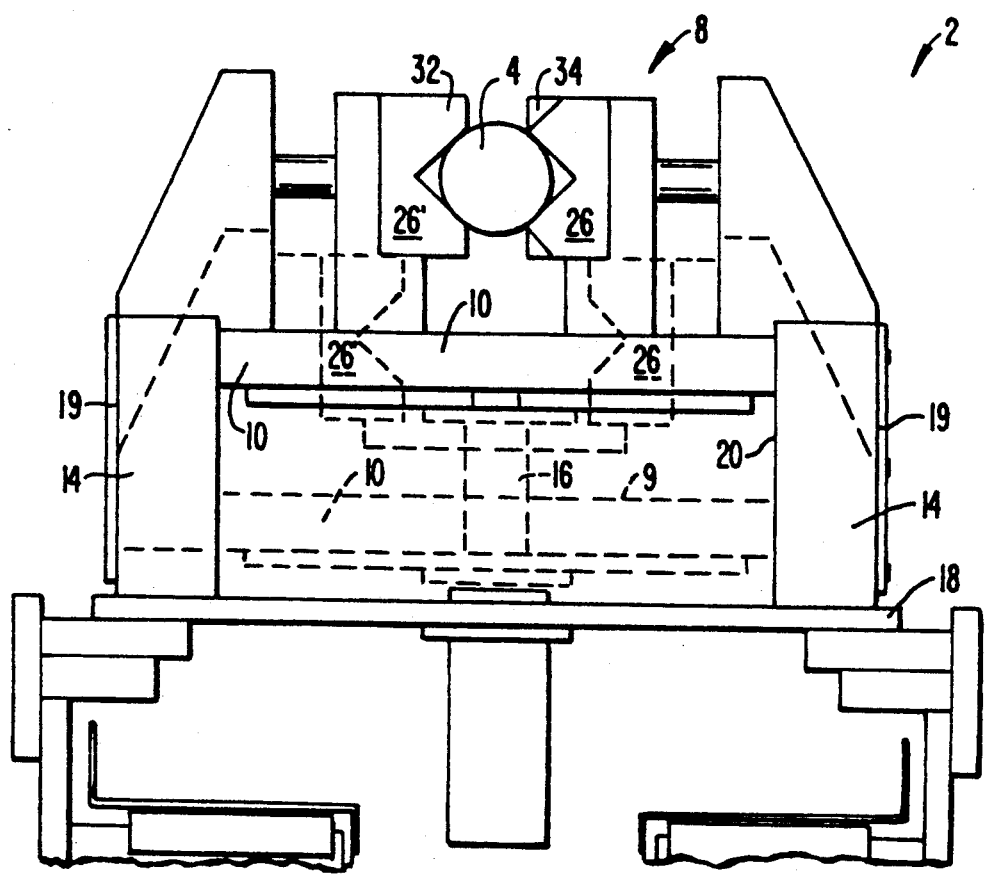
FIG._3.

CENTERING STAND FOR CYLINDER HOLDER

BACKGROUND OF THE INVENTION

The present invention relates to a centering stand for positioning a work piece for rotary skiving and roller burnishing operations in a hollow cylinder.

Rotary skiving tools are used to accurately cut small quantities of material from the wall of a cylindrical hole. After the skiving tool has made a pass through the work piece, it is usually drawn back through the newly worked hole. Skiving tools are often used in combination with a roller burnishing tool so that the skiving tool first cuts or shaves off a small amount of material from the hole and then the roller burnishing tool, mounted coaxially on the same drive shaft with the skiving tool, burnishes the hole to a smooth finish.

If the diameter of the interior of a cylinder is very close to its nominal diameter, the roller burnishing operation will typically proceed quite smoothly. However, if the diameter of the cut cylinder is slightly oversized, the interior surface of the cylinder may not be sufficiently burnished. If the diameter is somewhat smaller than nominal, caused by cutting tool wear or other variables, the effective fixed diameter of the rollers will cause excessive working of the interior surface of the cylinder, requiring large forces to drive the tool through the cylinder, and often resulting in jamming of the tool inside the cylinder. Additionally, an out-of-tolerance hole or an out-of-alignment cylinder may cause jamming as well. If jamming does occur, the tool often cannot be retrieved intact, resulting in destruction of an extremely expensive working tool.

A roller burnishing tool is typically inserted into the cylinder through a draw tube to align it with the interior of the cylinder. The draw tube has the same or nearly the same diameter as the cylinder, and the roller burnishing tool as described above will roller burnish the draw tube on each cycle. Eventually, the draw tube becomes oversized, and the draw tube will not accurately align the tool with the cylinder, again resulting in jamming.

Hollow cylinders are employed in various applications, including use as hydraulic and pneumatic cylinders. These cylinders vary in length from 31 inches to 24 feet. Diameters range from 2-7 inches. Both thin-walled and heavy wall cylinders are used, depending upon the specific application. Thin-walled cylinders are often advantageous because of weight and cost considerations while heavy walled cylinders may be necessary for applications requiring additional strength. However, both thin-walled and heavy walled cylinders exhibit characteristics causing jamming of the tool. Thin-walled cylinders tend to bow, causing the cylinder to become out of alignment with the tool. Heavy walled cylinders tend to rotate during rotary operations, also resulting in the tool becoming out of alignment. In either case, the tool must be properly aligned and secured to avoid jamming, and resultant destruction of the expensive tool and workpiece.

Various improvements have been made adaptable for use with rotary skiving and roller burnishing apparatus. One such feature is described in U.S. Pat. No. 4,425,693 entitled "Retractable Knife For Skiving Tool" issued on Jan. 17, 1984, the disclosure of which is incorporated by reference.

SUMMARY OF THE INVENTION

The present invention provides a centering stand for positioning a work piece for rotary skiving and roller burnishing operations in a hollow cylinder. The centering stand properly positions the cylinder for rotary operations, minimizing bowing of the cylinder. Proper alignment of the cylinder affords an automated rotary skiving and roller burnishing apparatus which is simple, reliable and efficient in operation and is easily set up. Additionally, the centering stand of the present invention provides a consistent finish, and fast part cycle time.

The centering stand includes a conventional vice having a grip for maintaining the cylinder in proper centered and aligned position for rotary operations. A base plate is movable between a raised position supporting the cylinder and a lowered position removed therefrom. The base plate travels along a track formed between a plurality of guide members. The track is bounded by a recess formed in an inner surface of the guide members and a track plate mounted to the outer surface of each guide member. A positive positioning coupling properly aligns the cylinder for centered rotary operation.

The vice is movable with the base plate between a raised position maintaining the cylinder in centered alignment and a lowered position removed from the cylinder. A lift, preferably a hydraulic lift, operates to move the base plate and vice between the raised and lowered positions.

In the preferred embodiment, the positive positioning coupling includes a dovetail formed on an upper surface of the base plate cooperating with a lip disposed at the upper end of the guide members. The lip preferably projects in an inwardly direction toward the opposite guide member and downwardly so as to engage the dovetail.

The present invention may be adapted for use of thin-walled cylinders or for heavy stock removal on heavy wall cylinders. In the application for heavy wall cylinders, serrated teeth are employed to retain the cylinder preventing rotation during heavy stock removal.

BRIEF DESCRIPTION OF THE DRAWINGS

FIG. 1 is a perspective view of the centering stand in combination with the rotary skiving and roller burnishing apparatus.

FIG. 2 is a side view of the centering stand of the present invention.

FIG. 3 is a front view of the present invention in which a cylinder is placed in the aligned position.

DETAILED DESCRIPTION OF THE PREFERRED EMBODIMENT

Referring now to FIG. 1, the overall structure of rotary operation apparatus 6 will be described. Rotary skiving and roller burnishing operations are performed on a long cylinder 4. Apparatus 6 may be constructed to accommodate ranges of length of cylinder from 31 inches to 24 feet. Diameters of the cylinder may range from 2-7 inches. Apparatus 6 includes end clamping units 38, 38' positioned at opposite ends of apparatus 6 for adaption to varying lengths of cylinder 4. End clamping units 38 are slidable along rails 40 to clamp the ends of varying length of cylinder 4. A support table 28 is disposed intermediate end clamping units 38, 38' for vertically supporting cylinder 4. Two centering stands 2, 2' are positioned at opposite ends of apparatus 6, on opposite sides of support table 28, between end clamping units 38, 38', as seen in FIG. 1.

Centering stands 2, 2' maintain cylinder 4 in proper centered and aligned position for performing rotary skiving and roller burnishing operations by rotary operation apparatus 6. For ease of discussion, only one centering stand 2 will be described in detail. It is to be understood that the centering stands 2, 2' at each end of apparatus 6 are identical.

Referring now to FIGS. 2 and 3, centering stand 2 includes a conventional vice 8 for retaining cylinder 4 in its properly centered and aligned position as seen in FIG. 1 and in solid lines in FIGS. 2 and 3. A base plate 10 supports vice 8 for performing rotary operations on cylinder 4. Base plate 10 is located to properly position vice 8 by positive positioning coupling 12. Positive positioning coupling 12 is formed between a plurality of guide members 4 and base plate 10.

Conventional vice 8 includes grips 26, 26' for automatically retaining cylinder 4 in its properly centered position. Grips 26, 26' are longitudinally opposed to each other. Grip 26 includes a V-shaped recess coacting with a similar recess formed in opposite grip 26'. Opposed grip 26' is a mirror image of first grip 26. Each grip 26, 26' includes a plurality of teeth 32 and corresponding recesses 34 at each of its upper and lower ends. Teeth 32 prevent rotation of cylinder 4 in the case of heavy wall cylinders.

A hydraulic lift 16 moves base plate 10 and vice 8 in the direction of arrow A as seen in FIG. 2. Lift 16 has a raised position maintaining cylinder 4 in its proper centered and aligned position as seen in solid lines in FIGS. 2 and 3 and a lowered position removed from the cylinder as seen in dashed lines in FIGS. 2 and 3. Base plate 10 rests on guide plate 18 in its lowermost position.

Guide members 14 include a recess 21 formed on an inner surface 15 for accommodating travel of base plate 10 to an upper end 13 of guide members 14. A track plate 19 is mounted by screws 25 to each guide member 14, forming a track 20 between the guide members. Positive positioning coupling 12 includes a lip 22 and a dovetail connection 24. The lip 22 is disposed at upper end 13 of the guide members 14. Lip 22 extends inwardly toward the remaining guide members 14 and downwardly in the direction of guide plate 18. Dovetail 24 tapers downwardly, forming an angle of approximately 60° with track 20. Dovetail 24 is formed on an upper surface 9 of base plate 10 at an outer edge 11 of base plate 10. Dovetail 24 engages lip 22 so that base plate 10 is exactly horizontal and stops at the appropriate elevation. In this manner, during rotary skiving and roller burnishing operations, positive positioning coupling 12 holds cylinder 4 in perfectly centered and aligned position, preventing twisting, rotation and excessive vibration of the cylinder.

The operation of centering stands 2, 2' will now be described. A cylinder 4 is placed in load position on a pair of tube supports 36 of support table 28. Support table 28 moves to the left in the direction of arrow B, as seen in FIG. 1, to locate cylinder 4 in position for rotary operations. End clamping units 38, 38' squeeze cylinder 4, maintaining the positioning of the cylinder for start of the rotary skiving and roller burnishing operations. Conventional centering vices 8, 8' mounted on centering stands 2, 2' center cylinder 4 laterally in position to within 1/1000s of an inch. Vertical alignment is achieved by positive positioning coupling 12 disposed on centering stands 2, 2'. The operation of positive positioning coupling 12 will be described below. Precise alignment is required to ensure accurate rotary skiving and roller burnishing operations. Tube supports 36 are lowered, moving away from cylinder 4.

In the lowered position of centering stand 2, shown in dashed lines in FIG. 3, base plate 10 is positioned above guide plate 18. Lift 16 raises base plate 10 in track 20, along with vice 8 to its uppermost position for maintaining cylinder 4 in proper position. Dovetail 24 is received by lip 22 for ensuring proper elevational location of base plate 10 relative to guide members 14. Thus, positive positioning coupling 12 ensures alignment and centering of vice 8.

Vice 8 closes on cylinder 4 for maintaining the cylinder in its centered and aligned position for efficient operation of rotary skiving and roller burnishing apparatus 6. Once cylinder 4 is in its aligned position, a tool, not shown, cuts and finishes the inner surface of cylinder 4. A skiving element positioned on the tool cuts the inner diameter precisely to the desired size. Rollers mounted coaxially on the same drive shaft as the skiving element then burnish the inner surface of the cylinder. At the end of the traverse of the tool through the entire length of cylinder 4, the tool is withdrawn from cylinder 4, resulting in a smooth-finished, precision-bored cylinder.

Although the preferred embodiment employs a hydraulic cylinder, the lift of the centering stand may be of any type, for example, a pneumatic lift. Additionally, the track plate may be mounted to the guide members in any desired manner.

This invention has been described with reference to the preferred embodiment. Variations and modifications can be made without departing from the scope of the present invention, which is limited only by the following claims.

What is claimed is:

1. A centering stand for positioning a hollow cylinder for machining operations by a rotary tool, said stand comprising:

a vice including a pair of grips for retaining the cylinder in proper centered, aligned and non-rotatable position for rotary tool operations;

a base plate for supporting said vice so that the cylinder is non-rotatably retained in proper centered and aligned position;

said vice being movable with said base plate between a raised position for maintaining the cylinder in proper centered and aligned and non-rotatable position and a lowered position disengaged and spaced from the cylinder;

a plurality of guide members for guiding said base plate, each guide member including a track formed on an inner surface of said guide member for movement of said base plate in said track; and means formed in at least one of said guide members for engaging said base plate at its raised position to ensure centering and alignment of the cylinder in proper position for rotary operations, thereby minimizing bowing of the cylinder.

2. The centering stand as defined by claim 1 wherein said base plate includes a dovetail formed on an upper surface of said base plate and wherein said engaging means includes cooperating means operatively associated with said dovetail formed in at least one of said guide members.

3. The centering stand as defined by claim 2 wherein said cooperating means includes a lip disposed at an upper end of each side guide member.

4. The centering stand as defined by claim 1 wherein said base plate includes a plurality of corners each having a dovetail formed on an upper surface of the base plate and wherein said plurality of guide members includes a guide member positioned at each corner of said base plate, each said guide member including a lip disposed at an upper end of said guide member, said lips projecting inwardly towards the remaining guide members and downwardly so as to engage said dovetails.

5. The centering stand as defined by claim 4 wherein said dovetails taper at an angle of approximately 60° from said track.

6. The centering stand as defined by claim 1 wherein said track comprises a recess formed on the inner surface of each guide member, and includes a track plate mounted to an outer surface of the guide members such that said base vertically slides within said recess and is retained in said track by said track plate.

7. The centering stand as defined by claim 1 further comprising a lift for moving said base plate within said track.

8. The centering stand as defined by claim 7 wherein said lift comprises a hydraulic cylinder.

9. The centering stand as defined by claim 1 wherein said vice includes a V-shaped grip for preventing rotation of the cylinder.

10. A centering stand for positioning a cylinder for machinery operations by a rotary tool, said stand comprising:
- a vice having a pair of grips for retaining the cylinder in a proper non-rotatable position for rotary tool operations;
- a movable base plate for supporting said vice and maintaining the cylinder in proper position, said base plate including a plurality of corners;
- a plurality of guide members disposed at each corner of said base plate for guiding movement of said base plate, each guide member including a track formed between said guide members on an inner surface of said guide members for movement of said base plate in said track;
- means disposed on said base plate and said guide members for locating said base plate to align and center the cylinder in proper non-rotatable position for rotary operations, said locating means comprising dovetails formed on an upper surface of said base plate and lips formed in the upper ends of said guide members for cooperating with said dovetails, said lips projecting in an inward direction and extending downwardly so as to engage said dovetail; and
- a lift for moving said base plate between a raised position maintaining the cylinder in proper position and a lowered position removed from the cylinder, said vice being movable with said base plate.

11. The centering stand as defined by claim 10 wherein said track comprises a recess formed on the inner surface of each guide member, and includes a track plate mounted to an outer surface of the guide members such that said base vertically slides within said recess and is retained in said track by said track plate.

12. The centering stand as defined by claim 10 wherein said dovetail tapers at an angle of approximately 60° from said track.

13. A rotary device for performing skiving and roller burnishing operations on a work piece for forming a hollow cylinder therefrom comprising:
- a support table for generally locating the cylinder; and
- a centering stand for automatically properly centering and aligning the position of the cylinder for rotary operation, said centering stand including:
- a vice having a pair of grips for retaining the cylinder in proper centered, aligned and non-rotatable position;
- a base plate supporting said vice for positioning said vice for proper positioning of the cylinder;
- said centering stand including a plurality of guide members for guiding said base plate, a track formed on an inner surface of each guide member for movement of said base plate in said track;
- means disposed on said base plate and said guide members for aligning the cylinder in proper centered and aligned position for performing rotary operations, said aligning means comprising dovetails formed on an upper surface of said base plate and lips formed in the upper ends of said guide members for cooperating with said dovetails, said lips projecting in an inward direction relative to said track and extending downwardly so as to engage said dovetails; and
- a lift for moving said base plate and said vice between a raised position maintaining the cylinder in proper position and a lowered position removed from the cylinder.

14. The rotary device as defined by claim 13 wherein said track comprises a recess formed on the inner surface of each guide member, and includes a track plate mounted to an outer surface of the guide members such that said base plate vertically slides within said recesses and is retained in said track by said track plate.

15. The rotary device as defined by claim 13 wherein said dovetail tapers at an angle of approximately 60° from said track.

* * * * *